US009430566B2

(12) United States Patent
Chakravarthy et al.

(10) Patent No.: US 9,430,566 B2
(45) Date of Patent: Aug. 30, 2016

(54) CONTROL OF WEB CONTENT TAGGING

(75) Inventors: Ananth Chakravarthy, Pune (IN); Indiver N Dwivedi, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1853 days.

(21) Appl. No.: 12/501,423

(22) Filed: Jul. 11, 2009

(65) Prior Publication Data
US 2011/0010414 A1  Jan. 13, 2011

(51) Int. Cl.
G06F 15/16 (2006.01)
G06F 17/30 (2006.01)

(52) U.S. Cl.
CPC ... G06F 17/30864 (2013.01); G06F 17/30371 (2013.01)

(58) Field of Classification Search
CPC ............ G06F 17/30864; G06F 17/30371
USPC ............................................ 709/203
See application file for complete search history.

(56) References Cited

U.S. PATENT DOCUMENTS

| 6,735,585 | B1 * | 5/2004 | Black et al. | |
| 6,910,077 | B2 * | 6/2005 | Najork | 709/229 |
| 7,296,223 | B2 * | 11/2007 | Chidlovskii et al. | 715/234 |
| 7,596,571 | B2 * | 9/2009 | Sifry | |
| 7,599,938 | B1 * | 10/2009 | Harrison, Jr. | 705/7.29 |
| 7,627,565 | B2 * | 12/2009 | Budzik et al. | |
| 7,644,072 | B2 * | 1/2010 | Budzik et al. | 707/748 |
| 7,756,926 | B2 * | 7/2010 | Tseng et al. | 709/204 |
| 7,770,102 | B1 * | 8/2010 | Wolff et al. | 715/234 |
| 7,792,836 | B2 * | 9/2010 | Taswell | 707/737 |
| 7,809,709 | B1 * | 10/2010 | Harrison, Jr. | 707/707 |
| 7,844,594 | B1 * | 11/2010 | Holt et al. | 707/709 |
| 7,860,872 | B2 * | 12/2010 | Serjeantson et al. | 707/755 |
| 7,865,358 | B2 * | 1/2011 | Green et al. | 704/10 |
| 7,958,107 | B2 * | 6/2011 | Curtis | 707/706 |
| 7,970,868 | B2 * | 6/2011 | Garg et al. | 709/219 |
| 8,001,125 | B1 * | 8/2011 | Magdalin et al. | 707/737 |
| 8,024,343 | B2 * | 9/2011 | Gallagher | 707/737 |

(Continued)

FOREIGN PATENT DOCUMENTS

WO     WO 2008045792 A2 *    4/2008

OTHER PUBLICATIONS

Recupero, D.R., "A New Unsupervised Method for Document Clustering by Using Word Net Lexical and Conceptual Relations," In Information Retrieval, Dec. 2007 [retrieved Dec. 20, 2008] vol. 10, No. 6, pp. 563-579, retrieved from the Internet: <URL:http://www.springerlink.com/content/4313791h4p045616/>, 1 pg.

(Continued)

*Primary Examiner* — Melvin H Pollack
(74) *Attorney, Agent, or Firm* — Cuenot, Forsythe & Kim, LLC

(57) ABSTRACT

The integrity of an existing tag set associated with a web module is protected by reviewing user-generated proposed additions to the tag set to determine whether the proposed addition is appropriate. An initial test is made to determine whether a proposed addition is trivial; e.g., includes strings of the same character. If the proposed addition is not found to be trivial, it is assessed to determine its relatedness to the existing tag set. The proposed addition is made a part of the tag set only if it is found to be sufficiently related to the existing tag set.

11 Claims, 4 Drawing Sheets

(56) References Cited

U.S. PATENT DOCUMENTS

| | | | |
|---|---|---|---|
| 8,065,336 B2* | 11/2011 | Armstrong et al. | 707/794 |
| 8,165,974 B2* | 4/2012 | Privault et al. | 706/12 |
| 8,176,006 B2* | 5/2012 | Lin et al. | 707/609 |
| 2006/0155751 A1* | 7/2006 | Geshwind et al. | 707/102 |
| 2007/0094359 A1* | 4/2007 | Lamoureux | 709/220 |
| 2008/0052372 A1* | 2/2008 | Weber et al. | 709/217 |
| 2008/0282198 A1* | 11/2008 | Brooks et al. | 715/854 |
| 2008/0288347 A1* | 11/2008 | Sifry | 705/14 |
| 2009/0100154 A1* | 4/2009 | Stevenson et al. | 709/220 |
| 2009/0240692 A1* | 9/2009 | Barton et al. | 707/5 |
| 2009/0320119 A1* | 12/2009 | Hicks et al. | 726/9 |
| 2009/0327877 A1* | 12/2009 | Slaney et al. | 715/256 |
| 2010/0030859 A1* | 2/2010 | Huang | 709/206 |
| 2010/0063799 A1* | 3/2010 | Jamieson | 704/9 |
| 2010/0082333 A1* | 4/2010 | Al-Shammari | 704/10 |
| 2010/0211570 A1* | 8/2010 | Ghanea-Hercock et al. | 707/739 |
| 2010/0293195 A1* | 11/2010 | Houghton | 707/776 |
| 2010/0332964 A1* | 12/2010 | Duman et al. | 715/230 |

OTHER PUBLICATIONS

Sedding, J. et al., "Wordnet-Based Text Document Clustering," [online] In Proc. of 3rd Workshop on Robust Methods in Analysis of Natural Language Data, pp. 104-113, Assoc. for Computational Linguistics, 2004 [retrieved Dec. 20, 2008] retrieved from the Internet: <http://www-users.cs.york.ac.uk/kazakov/papers/SeddingKazakov-paperRomand04.pdf>, 10 pg.

* cited by examiner

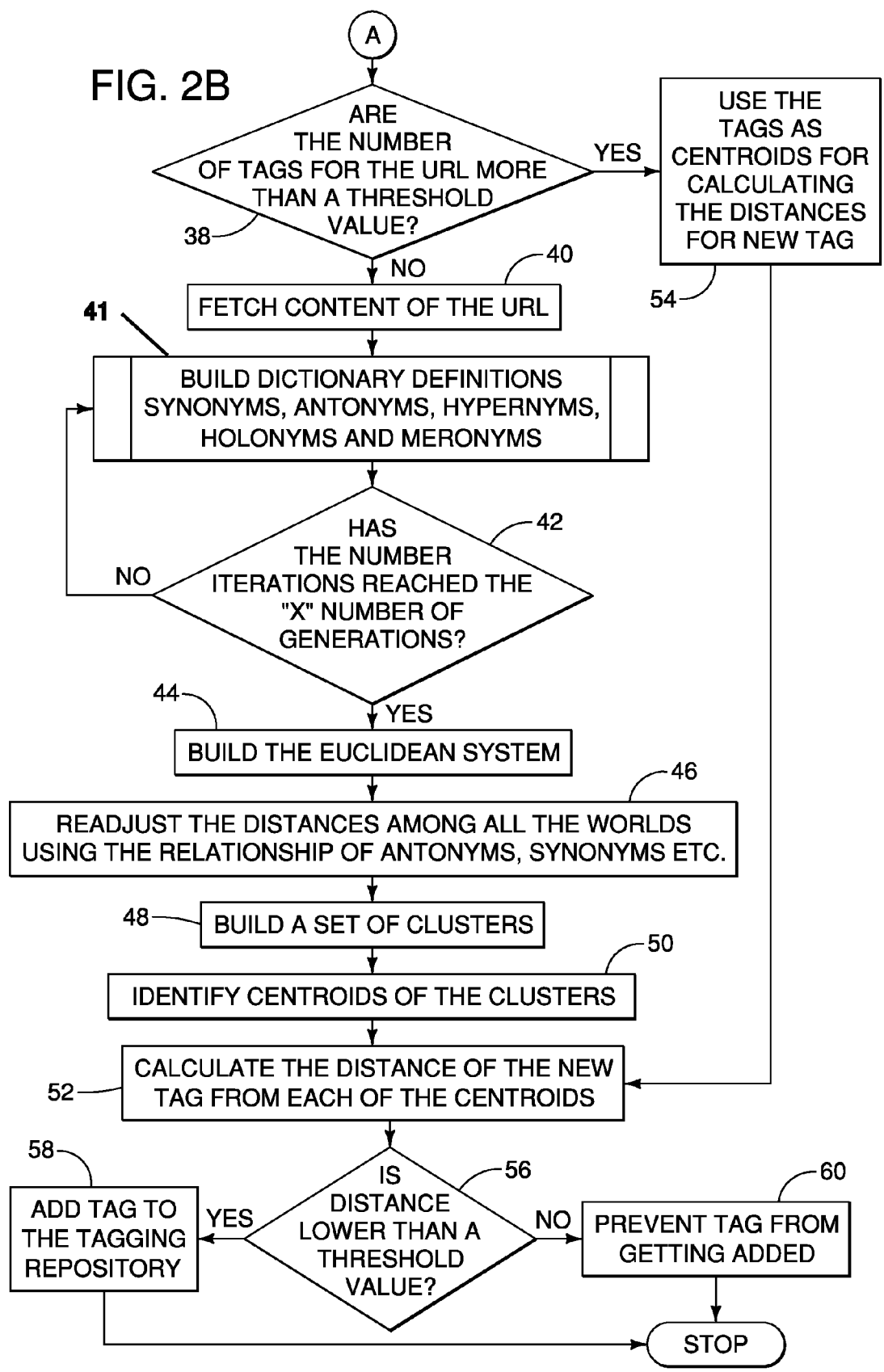

CONTROL OF WEB CONTENT TAGGING

BACKGROUND

A web tag is any user-generated word or phrase that can be associated with web content. Tagging helps organize web content and label it in a way that has personal meaning to the tagging user. Allowing users to tag items with self-chosen labels can result in better or stronger identification of the content. Tagging allows multiple people to opine, in public, what they think about particular pages or images. Tag clouds (or word clouds) are lists or visual displays of tags weighted by popularity. For example, tag clouds can be graphical representations of popular tags pertaining to a web site or web page with attributes such as popularity or importance of individual tags being indicated by font size or color of tags. Examples of websites that use tags or tag clouds include technorati.com, delicious.com, flicr.com, last.fm, and librarything.com Tagging is seen as a useful aspect enabling systems such as social networking or web 2.0 based systems. By enabling a tagging mechanism for resources like web pages, interesting applications can be built using the resource's tag set. For example, search applications, rating systems and enterprise-wide expertise builder systems can be built using the tags that might come in from various tagging repositories. However, relying on tag sets in building applications and systems is not free of risk. If agents or bots are written to maliciously sabotage tagging systems by introducing tags that pollute the tag set, then systems that depend on the tag set could produce wrong or incoherent results.

As social networking systems or systems that utilize tagging become more popular, it is likely that hackers will create more mechanisms to will attempt to sabotage these systems.

SUMMARY

The invention may be embodied as a system that includes a processor and a memory device for storing at least one web module and a tag set associated with the web module. The tag set includes one or more user-generated tags associated with the web module. The server also includes a network adapter for receiving a user-generated request to add a proposed tag to the tag set and a tagging system configured to evaluate the acceptability of the proposed tag. The proposed tag is added to the tag set only if it is evaluated as being acceptable.

The invention may also be embodied as a method for controlling the integrity of a tag state that includes one or more user-generated tags associated with a web module. The method is performed in a server that includes a processor and a memory device for storing the web module and the existing tag set. A user-generated request to add a proposed tag to the existing tag set is received. The acceptability of the proposed tag is evaluated. The proposed tag is added to the existing tag set only if the proposed tag is evaluated as being acceptable.

The invention may also be embodied as a computer program product for controlling the integrity of a tag state that includes one or more user-generated tags associated with a web module. The computer program product includes a computer-usable medium that has program instruction recorded on the medium. The program instructions, when loaded onto and executed by a server, causes the server to receive a user-generated request to add a proposed tag to the existing tag set, to evaluate the acceptability of the proposed tag and to add the proposed tag to the existing tag set only if it is evaluated as being acceptable.

BRIEF DESCRIPTION OF THE VIEWS OF THE DRAWINGS

FIG. 2b is another portion of the flow chart of an embodiment of logic used by a system such as the system of FIG. 1 for defending against inappropriate tags.

DETAILED DESCRIPTION

This disclosure describes systems and methods for resisting attacks on tagging systems where the attacks misuse valid tagging system mechanisms to populate tagging systems with improper or noise tags that may cause other applications to "break".

Figure 1:
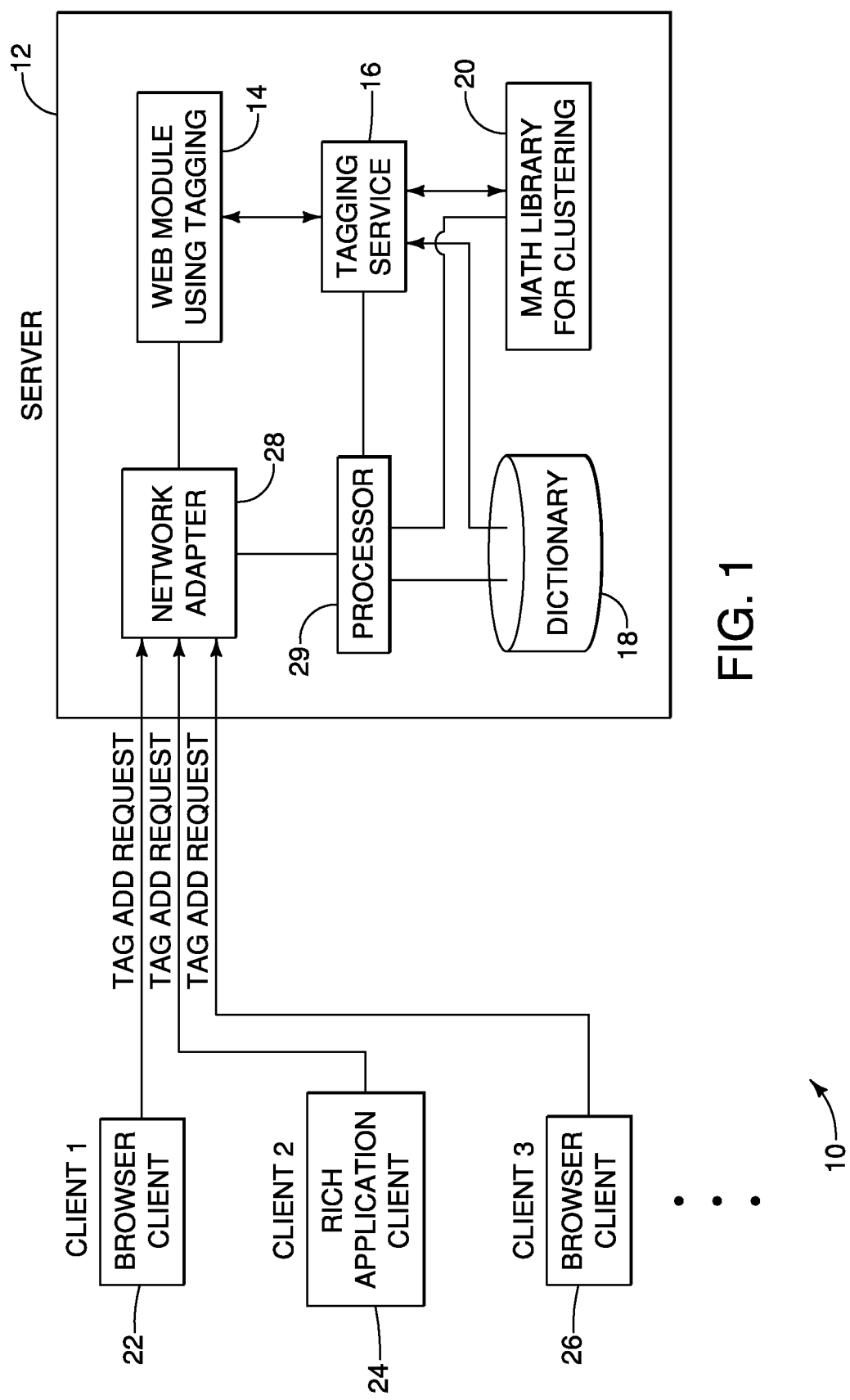
FIG. 1 is a block diagram of an embodiment of a system that defends against inappropriate tags.

FIG. 1 is a block diagram of a system 10 including a server 12 in accordance with one embodiment of the invention. In the illustrated embodiment, the server 12 includes a web module 14 that uses tagging. Examples of such a web module are a social networking application or Web 2.0 application. The server 12 further includes a tagging service 16 that receives tag add requests at the web module 14. The server 12 further includes a memory device for storing a dictionary or dictionaries 18 as well as a memory device for storing a math library or libraries 20. The memory device for storing the dictionary 18 may be the same as or different from the memory device for storing the math library or libraries 20. In operation, the tagging service 16 uses the dictionary or dictionaries 18 and math library or libraries 20 to decide whether to accept or reject a tag add request. The server 12 includes one or more network adapters, modems, or communication devices 28 for communication with clients 22, 24, 26, and additional clients, which may connect at separate times or simultaneously. Some of the clients, such as clients 22 and 26, may be typical users using browser clients, and other clients, such as client 24, may be rich application clients. The server also includes at least one processor 29 to control the network adapter(s) 28, the memory containing the dictionary 18, the web module 14, and the tagging service 16. Processor 29 will also execute functions defined in the math library or libraries 20 as well as other operations described below.

It has been found that tags that are considered to pollute a pre-existing set of tags associated with a given web resource tend to correlate poorly to the existing tags. Some embodiments of the invention use a dictionary (such as a WordNet dictionary) that indicates relatedness of terms. The distance of a proposed tag from the existing tag cloud cluster can be calculated, such as by using a k-means cluster calculation. WordNet dictionaries are described at a WordNet project web site maintained by Princeton University. WordNet provides a mechanism to represent a dictionary in an XML format so it can be queried by applications if required. Nouns, verbs, adjectives and adverbs are grouped into sets of cognitive synonyms called synsets, each expressing a distinct concept. Synsets are interlinked by conceptual-semantic and lexical relations. The resulting network of meaningfully related words and concepts can be navigated.

For each syntactic category (noun, verb, adjective, adverb), two files are used to represent the contents of the WordNet database—index.pos and data.pos, where pos is noun, verb, adj and adv. Each index file is an alphabetized list of all the words found in WordNet in the corresponding part of speech. On each line, following the word, is a list of byte offsets (synset_offset s) in the corresponding data file, one for each synset containing the word.

Though a WordNet dictionary is used in various embodiments described below, other types of dictionaries can be employed in alternative embodiments. XML versions of commonly available dictionaries could be used to more efficiently calculate the Euclidean distances than common dictionaries. Other custom domain language dictionaries can be put to use such as, for example, a java programming language dictionary. Further, dictionaries do not necessarily need to be English language dictionaries. A java dictionary could be used, for example, for a web page tagged with technical words. Other kinds of domain based dictionaries can be employed as well.

In some embodiments, distance between terms is calculated using the definition of a word. If the newly submitted tag exceeds a threshold value in terms of distance from all of the centroids in a cluster, such as a k-means cluster, then it can be treated as a noise tag and rejected.

In accordance with some embodiments, there are two parts or phases to a system or method for preventing noise tags from being added to a tagging system 14 defined in server 12. The first part uses the content of the web page itself to determine the centroids of a cluster. The second part uses previously added tags as the centroids while building the clusters. In some embodiments, the second part can be employed when the number of tags that have been associated with the URL or content has reached a particular threshold value. The reason for the optional two phased approach is to avoid a system overload that might result from calculating the centroids each time and also for performance reasons.

With the approach disclosed herein, tags can be evaluated by a computer, without requiring human intervention to prevent misuse of the tagging system.

The following terms are used herein:

A "hypernym" is a more generic term than an original term. This denotes the concept of "is a kind of" relationship. For example, "vehicle" is a hypernym of "car."

A "meronym" is part of a larger whole. For example, "wheel" is a meronym of "automobile."

A "holonym" is a word that names the larger whole of which the other word is a part. For example, a wheel is part of an automobile so "automobile" is a holonym of "wheel." Holonym is an antonym of meronym.

Figure 2A:
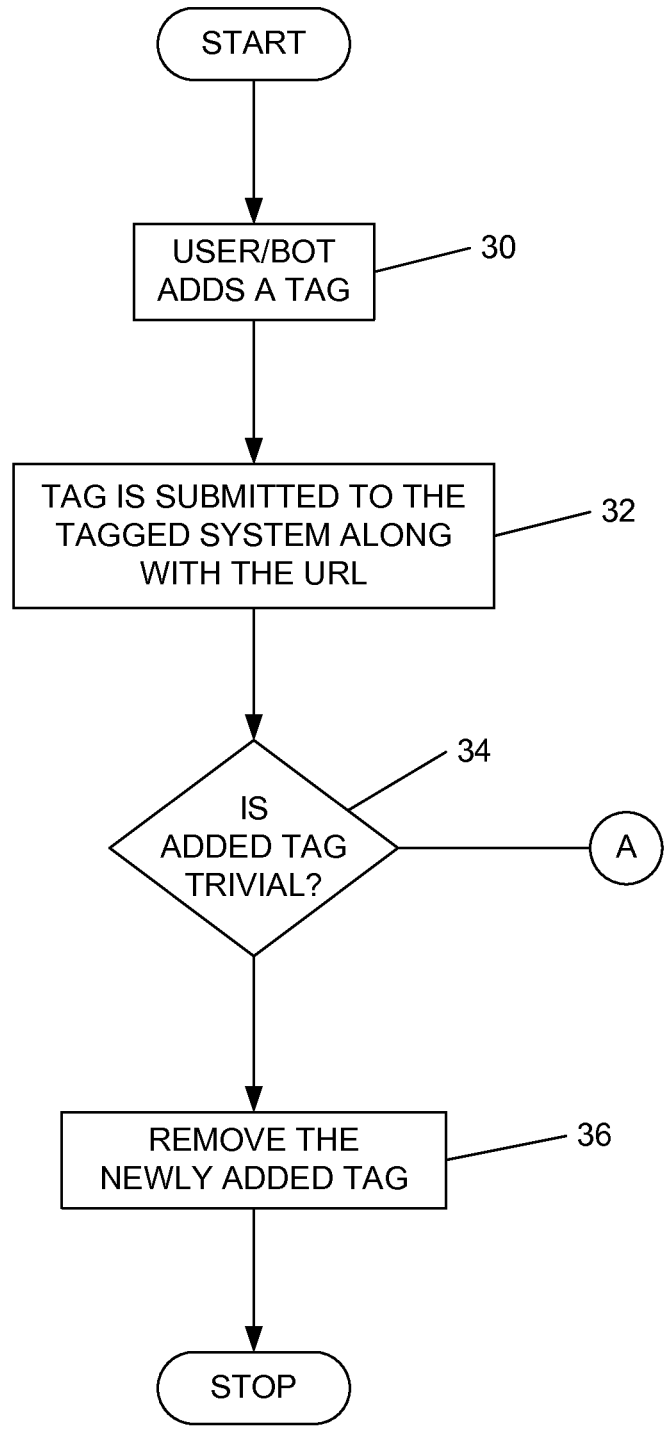
FIG. 2a is portion of a flow chart of an embodiment of logic used by a system such as the system of FIG. 1 for defending against inappropriate tags.

FIG. 2a is portion of a flow chart of an embodiment of logic used by a system such as the system of FIG. 1 for defending against undesired tags.

In the illustrated embodiment, the following steps are executed by the server 12 to impede a noise tag from being added to the tag cloud for a given resource.

In step 30, the server 12 receives a request to add a tag to the web module 14. The tag add request is received from a client (such as 22, 24, 26, etc.) and is received via a network adapter 28. The request to add a tag can be either from a legitimate user or a malicious bot trying to add a nonsensical tag. In some embodiments, a tagging widget is used to submit the tag and the current URL to which the tag pertains.

In step 32, the tag is submitted to the tagging system or service 16. In some embodiments of the invention, in step 34, the tagging system or service 16 triggers logic to determine whether or not the submitted tag is trivial. This step tries to weed out submitted tags like aaaaaaa, bbbaaaaaaaaabbb, xxxxxxx etc. There are various ways of determining whether a submitted tag is trivial. The determination can be performed using one or more of the following tests:

a. See if the tag is or includes a "regular expression." A "regular expression" is made of only a single character that repeats a predetermined number of times.

b. See if the word is part of a dictionary definition.

c. See if the word being added is not a trivial part of speech. For example, words which represent articles, prepositions and conjunctions in the English language (or whatever language or languages users of the module 14 employ) may be viewed as trivial.

If the submitted tag is determined in step 34 to be trivial, it is removed in step 36. If not, the server 12 proceeds to step 38.

In step 38, it is determined whether the number of tags already associated with the content or URL already exceeds a predetermined threshold value, say Tmin. If the predetermined threshold value is already exceeded, the server 12 proceeds to step 54. If not, the server 12 proceeds to step 40.

In step 40, the entire content of the URL-defined web resource to which the tag pertains is passed through a parser included in the tagging service 16 of the server 12. In the illustrated embodiment, the parser is configured to build the list of all the words that are present in the content associated with the URL. In some embodiments, the parser filters out all the trivial words from the content associated with the URL. This total set of current words present in the content (excluding any trivial words that are filtered out) can be denoted Tw.

In step 41, the set of words is increased using, for example, one or more of synonyms, antonyms, hypernyms, and meronyms of words Tw.

More particularly, in the illustrated embodiment, for individual words in Tw, synonyms are extracted in step 41 from a dictionary 18 stored in the server 12. In the illustrated embodiment, a WordNet dictionary is employed. In other embodiments, other types of dictionaries are employed that may be internal or external to the server 12. This set of synonyms can be denoted as Sw.

Similarly the antonyms, hypernyms, meronyms and holonyms of the words of the set Tw are calculated using the dictionary in step 41. These sets can be denoted as Aw, Hw, Mw, and Ow respectively.

Current words that are member elements t1, t2, t3, etc. of set Tw; antonyms that are member elements a1, a2, a3, etc. of the set Aw; synonyms that are member elements s1, s2, s3, etc. of set Sw; hypernyms that are member elements h1, h2, h3, etc. of set Hw; meronyms that are member elements m1, m2, m3, etc. of set Mw; and holonyms that are members elements o1, o2, o3, etc. of set Ow together form the members of generation 0. The members of all these sets can be denoted at $C^0_w$.

Next, synonyms, antonyms, hypernyms, holonyms and meronyms of the elements that belong to the sets Tw, Aw, Hw, Mw, Ow and Sw are looked up in the dictionary 18. All the dictionary definitions for these sets form members of generation 1. These members can be denoted as $c^1_w$ for the first generation collection of words. In some embodiments, duplicates are removed.

In the illustrated embodiment, step 41 is repeated for x generations. In some embodiments, the number x is set based on the amount of content associated with the URL. More particularly, in step 42, a determination is made as to whether generation x has been reached. If so, the server 12 proceeds to step 44; if not, the server 12 returns to step 41 so another generation can be built.

In the illustrated embodiment, after the $x^{th}$ generation set of words is generated, the centroids of each cluster are calculated as follows.

In step 44, the distance of each word in all of the sets of the x generations is calculated in terms of hops required to link a given word with another word in the dictionary. To understand this concept more clearly, consider the entire set of words in the WordNet dictionary as a tree and calculate the distance to traverse the tree from a given word to another word by counting the number of hops required. For example, consider the Downloadable Files available at World Wide Web site w3.org/TR/wordnet-rdf/. The downloadable files section gives word definitions in an XML format of the wordnet dictionary. The words in the Synsets file or the WordSenses files are actually references to the words in the main file WordNet Full Schema with various relationships. In some embodiments, the dictionary might not be a tree but a graph visualization, where distance between words can still be determined.

In step 46, in some embodiments, the distance that is obtained in step 44 is further refined if the two words are related. For example, if a word is an antonym of another word, the distance value is decreased by a predetermined amount of units. Similarly, if it is hypernym, the distance value is decreased by a predetermined number of units. This step can be omitted in some alternative embodiments. An example of counting of hops of step 46 will be described below in connection with in FIG. 3.

In step 48, a set of clusters is built using a clustering method, such as a K-means cluster. In alternative embodiments, alternative types of clustering can be employed, such as Locality Sensitive Hashing, Fuzzy C-means or QT clustering. By applying a clustering method like K-means clustering, the server 12 can get a list of clusters of words which actually represent the content associated with the URL to which the submitted tag pertains.

In step 50, the centroids of the clusters are identified or stored. In some embodiments, the centroids are identified in the clustering method of step 48 and step 50 is really part of step 48.

In step 52, the respective distances between the submitted tag and each of the centroids are calculated.

In step 54, a determination is made as to whether or not any of the distances of step 52 is below a predetermined threshold. If so, the server 12 proceeds to step 58. If not, the server 12 proceeds to step 60.

In step 58, the tag is added (accepted).

In step 60, the submitted tag is considered to be noise and is prevented from being added (is rejected). In some embodiments, a rejection message is returned to the client that is attempting to add the tag; in other embodiments, no rejection message is returned.

In some embodiments, if in step 38 the number of tags in a tag repository for a given URL is determined to be greater than the threshold value, then the tag words can themselves be used as centroids of clusters, in step 54. The distances from the submitted tag are calculated. This approach will remove the overhead of looking up terms in the dictionary repetitively for establishing the centroids.

Figure 3:
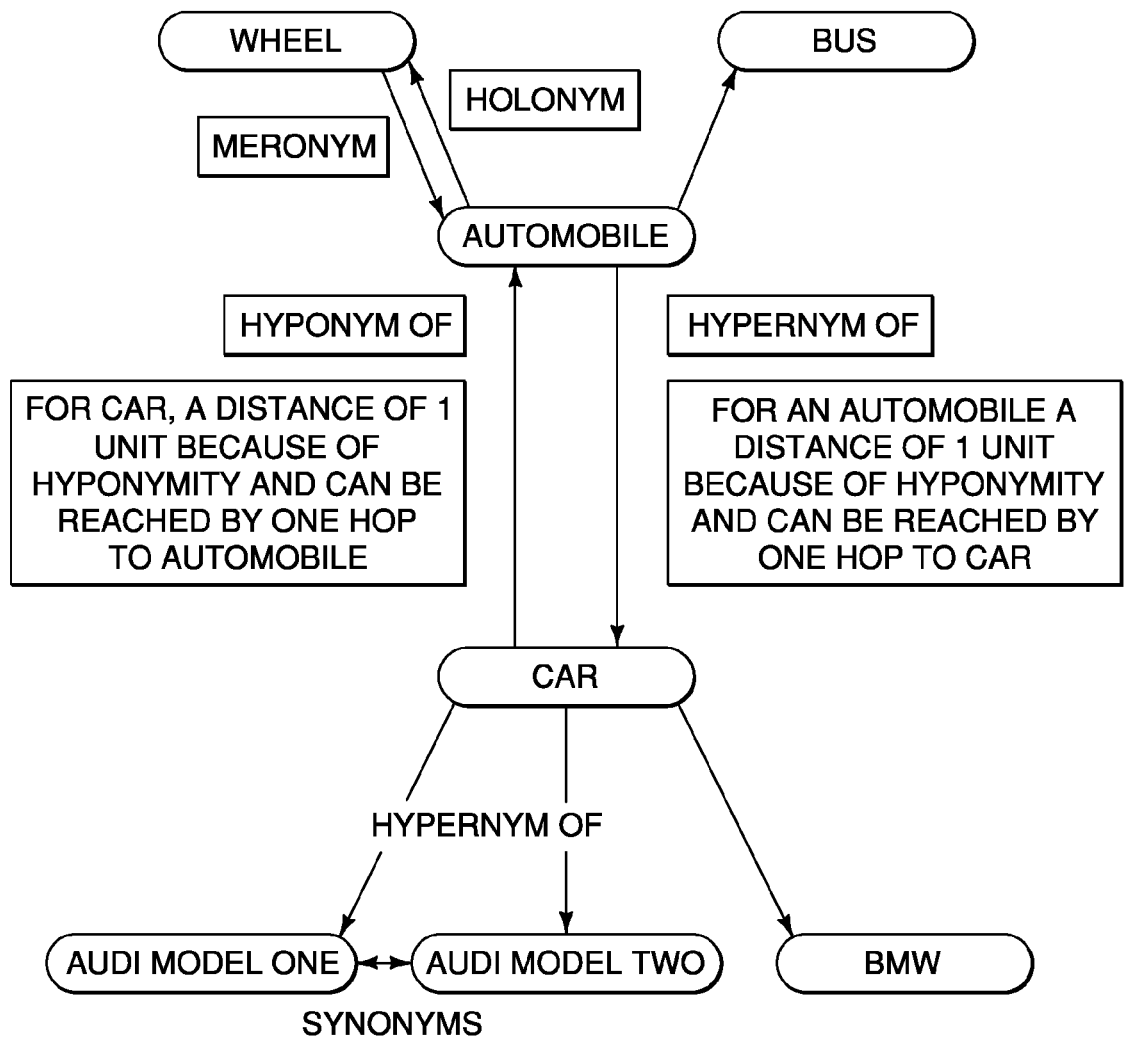
FIG. 3 is a diagram illustrating dictionary hops in an embodiment.

An example of counting of dictionary hops or measuring distance performed in step 46 is illustrated in FIG. 3.

In FIG. 3, "wheel" is a meronym of "automobile"; "automobile" is a holonym of "wheel"; "automobile" is a hypernym of "car"; "car" is a hyponym of "automobile"; "car" is a hypernym of "Audi Model One" and of "Audi Model Two"; and "Audi Model One" is a synonym of "Audi Model Two."

"Audi Model One" can be considered to be a distance of three units from "automobile" (including one hop to "Audi Model Two"); a distance of two units from "car," a distance of four units from "bus" and a distance of one unit to "Audi Model Two." "Audi Model One" can be considered to be a distance of one unit from "wheel" because "wheel" is a part of "Audi Model One" and is a meronym of "Audi Model One." "Car" is a distance of one unit from "automobile."

Embodiments of the invention can take the form of entirely hardware elements, entirely software elements or an combination containing both hardware and software elements. Some embodiments of the invention are implemented as software elements, which include but are not limited to firmware, resident software, microcode, etc.

Furthermore, embodiments of the invention can take the form of a computer program product recorded on a computer-usable medium or computer-readable medium providing program code for use by or in connection with a computer or any instruction execution system. For the purposes of this description, a computer-usable or computer readable medium can be any apparatus that can contain, store, communicate, propagate, or transport the program for use by or in connection with a computer, instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code, such as server 12, will include at least one processor 29 coupled directly or indirectly to a memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters in addition to network adapters 28 may also be coupled to the system to enable the data processing system to become coupled to other data processing systems or remote printers or storage devices through intervening private or public networks. Modems, cable modem and Ethernet cards are just a few of the currently available types of network adapters.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In compliance with the patent statutes, the subject matter disclosed herein has been described in language specific as to structural and methodical features. However, the scope of protection sought is to be limited only by the following claims. The claims are not to be limited by the specific features shown and described, as the description above only discloses example embodiments.

What is claimed is:

1. A system comprising:
   a server including a processor and a memory device for storing a web module and a tag set comprising one or more associated user-generated tags associated with the web module;
   a network adapter configured to receive a user-generated request to add a proposed tag to the tag set; and
   a tagging system configured to evaluate the acceptability of the proposed tag and to add the proposed tag to the existing tag set only if the proposed tag is evaluated as being acceptable, wherein
   said tagging system is configured to respond to a user-generated request to add a proposed tag to the tag set by:
      determining whether the number of tags in the existing tag set exceeds a predetermined threshold; and
      responding to a determination that the number of tags in the existing tag set exceeds a predetermined threshold by
         creating a data set comprising a set of words and relationships among the words,
         determining the relationship between the proposed tag and the words in created data set, and
         adding the proposed tag to the existing tag set only if the relationship is determined to be acceptable.

2. A system according to claim 1 wherein
   said tagging system is configured to provide a determination of triviality of a proposed tag by:
      selecting one or more tests selected from a set of tests comprising does the proposed tag fail to include a single character that repeats more than a predetermined number of times, is the proposed tag part of a dictionary definition, and is the proposed tag a trivial part of speech;
      determining whether a proposed tag satisfies each of the selected tests;
      rejecting any proposed tag that fails to satisfy any of the selected tests; and
      preliminarily accepting any proposed tag that satisfies all of the selected tests.

3. A system according to claim 1 wherein
   the set of words is selected from at least one of a set of words appearing in the content of the module and a set of words appearing in the existing tag set.

4. A system according to claim 1 wherein
   the data set includes one or more of the initial set of words and at least one of a synonym, an antonym, a hypernym, a holonym and a meronym for one or more of the words in the initial set of words.

5. A system according to claim 2 wherein
   said tagging system is configured to respond to a preliminarily accepted proposed tag by:
      determining whether the number of tags in the existing tag set exceeds a predetermined threshold; and
      responding to a determination that the number of tags in the existing tag set exceeds a predetermined threshold by
         creating a data set comprising a set of words and relationships among the words,
         determining the relationship between the proposed tag and the words in created data set, and
         adding the proposed tag to the existing tag set only if the relationship is determined to be acceptable.

6. A method for controlling the integrity of an existing tag set comprising one or more user-generated tags associated with a web module, said method being performed in a server comprising a processor and a memory device for storing the web module and the existing tag set, said method comprising:
   receiving a user-generated request to add a proposed tag to the existing tag set;
   evaluating the acceptability of the proposed tag; and
   adding the proposed tag to the existing tag set only if the proposed tag is evaluated as being acceptable; and
   responding to a user-generated request to add a proposed tag to the existing tag set by:
      determining whether the number of tags in the existing tag set exceeds a predetermined threshold; and
      responding to a determination that the number of tags in the existing tag set exceeds a predetermined threshold by
         creating a data set comprising a set of words and relationships among the words,
         determining the relationship between the proposed tag and the words in the created data set, and
         adding the proposed tag to the existing tag set only if the relationship is determined to be acceptable.

7. A method according to claim 6 wherein
   the evaluating the acceptability of the proposed tag further comprises making an initial determination of triviality of a proposed tag by:
      selecting one or more tests selected from a set of tests comprising does the proposed tag fail to include a single character that repeats more than a predetermined number of times, is the proposed tag part of a dictionary definition, and is the proposed tag a trivial part of speech;
      determining whether a proposed tag satisfies each of the selected tests;
      rejecting any proposed tag that fails to satisfy any of the selected tests; and
      preliminarily accepting any proposed tag that satisfies all of the selected tests.

8. A method according to claim 6 wherein
   the set of words is selected from at least one of a set of words appearing in the content of the module and a set of words appearing in the existing tag set.

9. A method according to claim 8 wherein
   the data set includes one or more of the initial set of words and at least one of a synonym, an antonym, a hypernym, a holonym and a meronym for one or more of the words in the initial set of words.

10. A method according to claim 7 wherein
    said tagging system is configured to respond to a preliminarily accepted proposed tag by:
       determining whether the number of tags in the existing tag set exceeds a predetermined threshold; and
       responding to a determination that the number of tags in the existing tag set exceeds a predetermined threshold by
          creating a data set comprising a set of words and relationships among the words,
          determining the relationship between the proposed tag and the words in created data set, and
          adding the proposed tag to the existing tag set only if the relationship is determined to be acceptable.

11. A method according to claim 10 wherein the set of words is selected from at least one of a set of words appearing in the content of the module and set of words appearing in the existing tag set.

* * * * *